United States Patent
Miyazaki et al.

(10) Patent No.: US 8,149,461 B2
(45) Date of Patent: Apr. 3, 2012

(54) IMAGE PROCESSING APPARATUS AND METHOD TO COMPENSATE FOR DISPLACEMENT OF DIFFERENT PRINTING POSITIONS IN DIFFERENT COLORS

(75) Inventors: Sadaaki Miyazaki, Nagoya (JP); Koichi Tsugimura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 563 days.

(21) Appl. No.: 12/411,340

(22) Filed: Mar. 25, 2009

(65) Prior Publication Data

US 2009/0244637 A1 Oct. 1, 2009

(30) Foreign Application Priority Data

Mar. 26, 2008 (JP) ................................. 2008-079769

(51) Int. Cl.
*H04N 1/58* (2006.01)
*H04N 1/60* (2006.01)

(52) U.S. Cl. ....... 358/2.1; 358/3.26; 358/1.18; 358/518; 358/540

(58) Field of Classification Search ................... 358/1.9, 358/2.1, 3.24, 3.26, 1.18, 518, 530, 532, 358/537, 540; 345/589, 592, 629; 382/162, 382/266, 274, 275
See application file for complete search history.

(56) References Cited

U.S. PATENT DOCUMENTS

| | | | |
|---|---|---|---|
| 7,362,467 B1 | 4/2008 | Tsukimura | |
| 7,978,364 B2 * | 7/2011 | Iguchi | 358/1.18 |
| 2007/0296749 A1 * | 12/2007 | Mizutani et al. | 347/14 |
| 2011/0148909 A1 * | 6/2011 | Besley | 345/592 |

FOREIGN PATENT DOCUMENTS

| | | |
|---|---|---|
| JP | 2000-232590 A | 8/2000 |
| JP | 2007-144730 A | 6/2007 |

* cited by examiner

*Primary Examiner* — Scott A Rogers
(74) *Attorney, Agent, or Firm* — Baker Botts L.L.P.

(57) ABSTRACT

An image processing apparatus includes: an acquisition unit; an edge detecting unit; a transparency setting unit; an image data generating unit; and an instruction unit. The acquisition unit acquires print data, the print data indicating an object image and a background image, a region of the object image being located at least partly inside a region of the background image. The edge detecting unit detects at least a part of an edge of the object image. The transparency setting unit sets an edge region that is located inside the region of the object image and that extends along the at least a part of the edge detected by the edge detecting unit, the transparency setting unit setting a transparency degree to the edge region of the object image. The image data generating unit generates image data based on the print data and on the transparency degree for the edge region of the object image. The instruction unit issues a printing instruction instructing that a plurality of color component images are printed in a plurality of different colors one on another based on the image data.

15 Claims, 9 Drawing Sheets

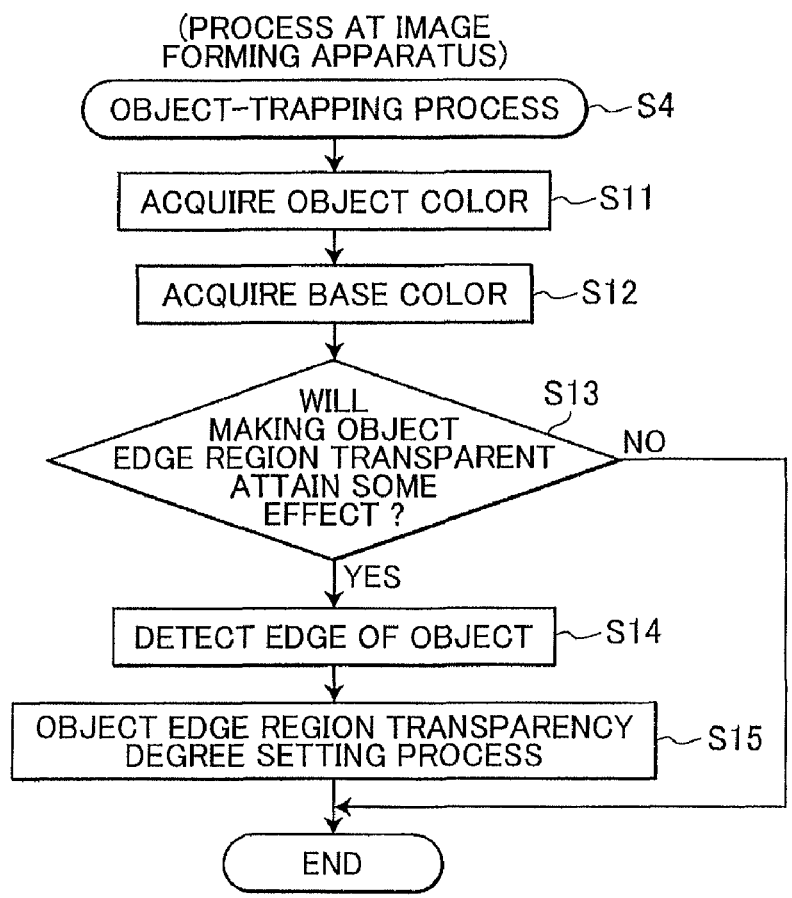

FIG.3

(PROCESS AT IMAGE FORMING APPARATUS)

OBJECT-TRAPPING PROCESS — S4
↓
ACQUIRE OBJECT COLOR — S11
↓
ACQUIRE BASE COLOR — S12
↓
WILL MAKING OBJECT EDGE REGION TRANSPARENT ATTAIN SOME EFFECT? — S13
— NO →
↓ YES
DETECT EDGE OF OBJECT — S14
↓
OBJECT EDGE REGION TRANSPARENCY DEGREE SETTING PROCESS — S15
↓
END

FIG.4(a)

EXAMPLE OF PRINT DATA

```
              Post script
101 ——→ 1 0 0 0 Setcmykcolor
102 ——→ 10 10 100 100  rectfill
103 ——→ 0 0 0 1 Setcmykcolor
104 ——→ /Time-Roman Findfont
105 ——→ 10 Scalefont Setfont
106 ——→ 10 10 moveto
107 ——→ (A) show
108 ——→ showpage
```

FIG.4(b)
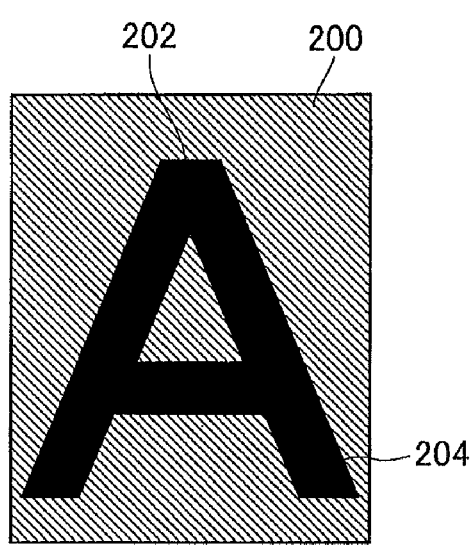
FIG.4(c)
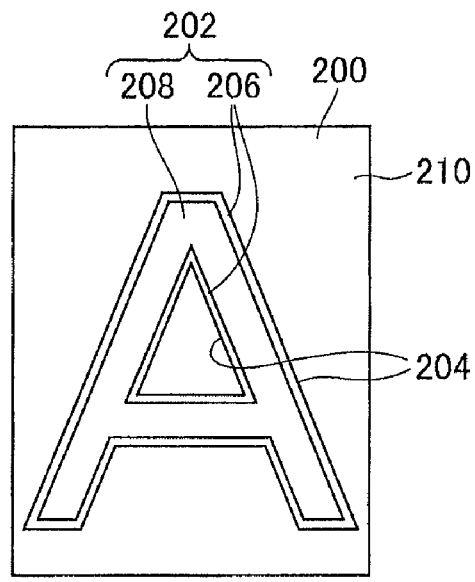
FIG.4(d)
CYAN PLANE
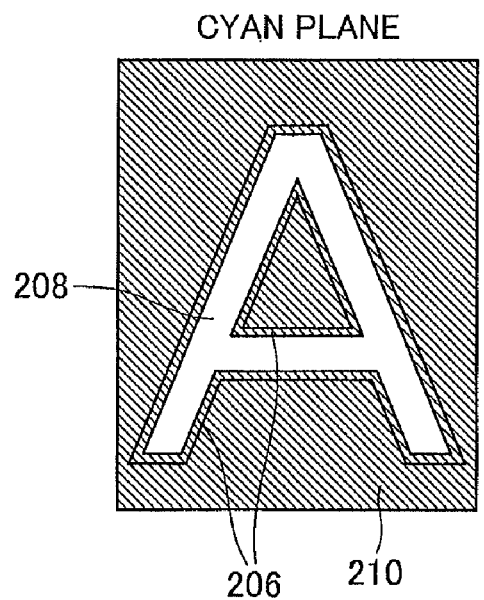
BLACK PLANE
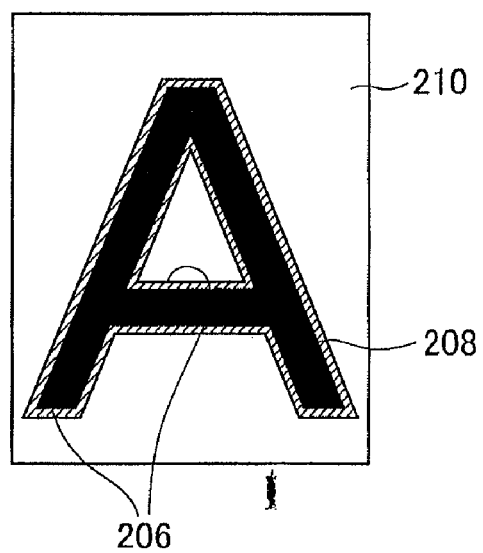

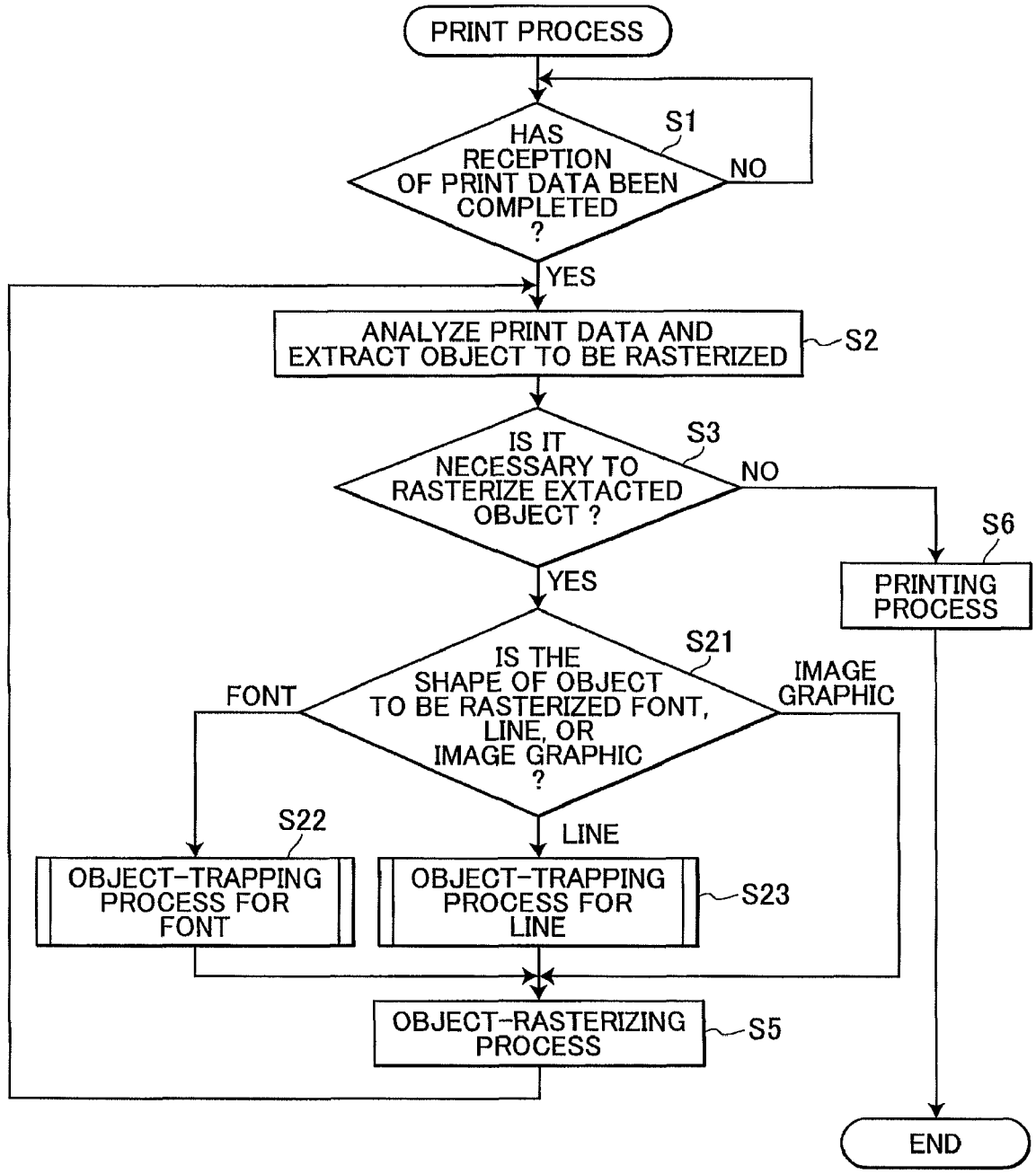

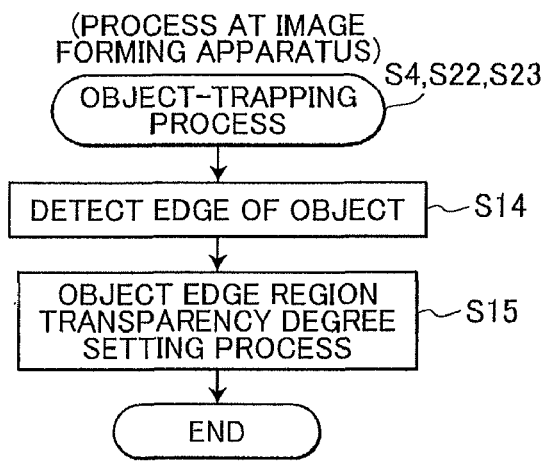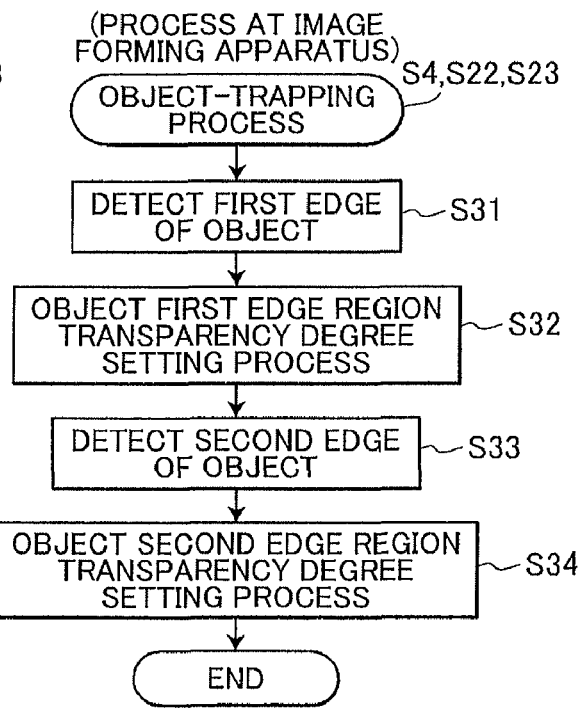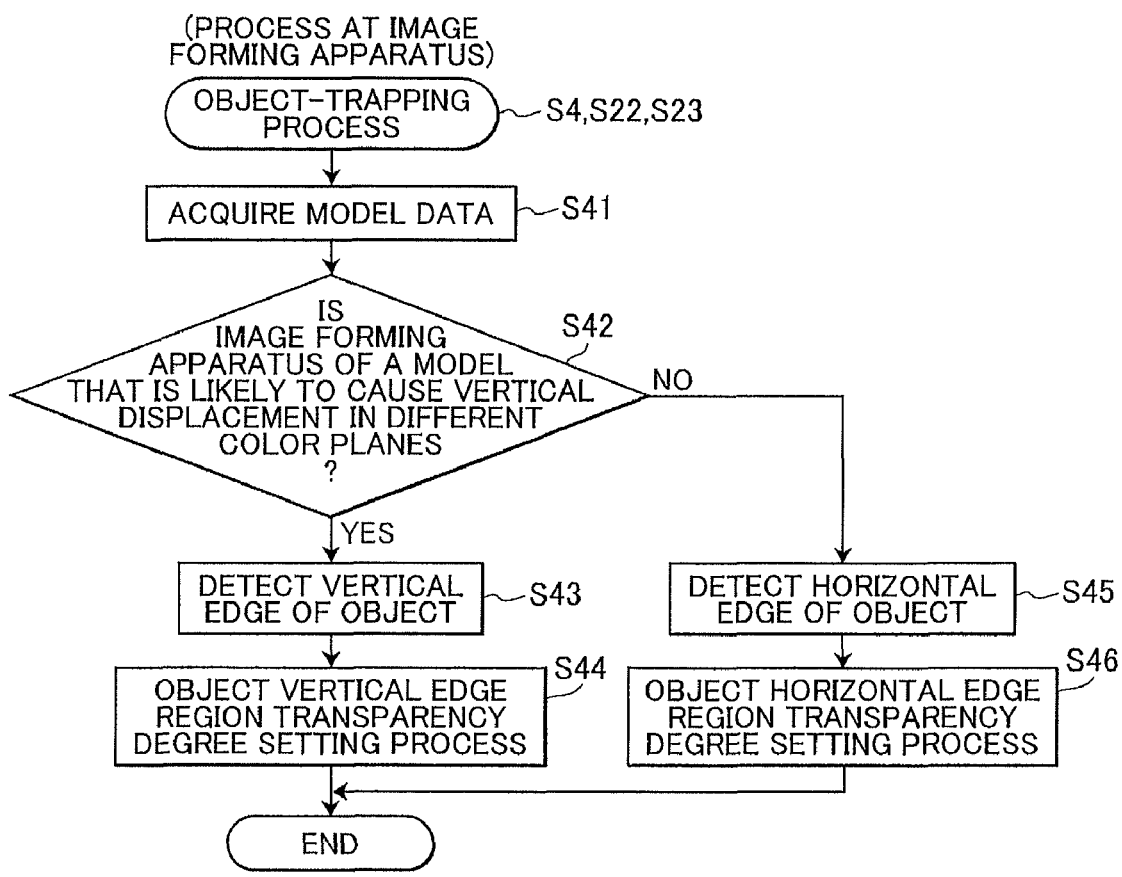

IMAGE PROCESSING APPARATUS AND METHOD TO COMPENSATE FOR DISPLACEMENT OF DIFFERENT PRINTING POSITIONS IN DIFFERENT COLORS

CROSS REFERENCE TO RELATED APPLICATION

This application claims priority from Japanese Patent Application No. 2008-79769 filed Mar. 26, 2008. The entire content of this priority application is incorporated herein by reference.

TECHNICAL FIELD

The present invention relates to an image processing apparatus.

BACKGROUND

A laser printer of a tandem type has been known, which separates the color of each pixel in image data into print colors (e.g., C, M, Y and K), thereby generating a plurality of sets of print color data, and which prints images of the respective print colors, one on another, thereby printing a multi-color image.

The laser printer of the tandem type has a plurality of drums, each for one print color. Arranged in parallel to one another, the drums can print images of respective colors at the same time. The printing speed is therefore high, which is an advantageous feature of the laser printer of this type. In some cases, however, the images of different colors may be displaced in position from one another. If the images are displaced in position from one another, the multi-color image printed will have blank regions and will inevitably be deteriorated in quality.

U.S. Pat. No. 7,362,467 describes a technique of first analyzing an image, that will appear being placed over a background image (which will be referred to as "upper image" hereinafter), and detecting a black region in the image analyzed, and expanding the background image partly into the black region to print the background image partly overlapped with the black region of the upper image, thereby suppressing generation of blank regions in the multi-color image.

SUMMARY

In the technique described in U.S. Pat. No. 7,362,467, in order to print the background image to spread wider than the original region to partly overlap with the black region of the upper image, the operating load of the image processing apparatus increases.

In addition, because the background image is printed partly overlapped with the upper image, many amount of toner is consumed. Toner consumption speed increases, which in turn increases the total printing cost.

In view of the foregoing, it is an object of the invention to provide an image processing apparatus that can suppress image-quality deterioration resulting from displacement of printing positions in different colors, while reducing the operating load.

In order to attain the above and other objects, the invention provides an image processing apparatus including: an acquisition unit; an edge detecting unit; a transparency setting unit; an image data generating unit; and an instruction unit. The acquisition unit acquires print data, the print data indicating an object image and a background image, a region of the object image being located at least partly inside a region of the background image. The edge detecting unit detects at least a part of an edge of the object image. The transparency setting unit sets an edge region that is located inside the region of the object image and that extends along the at least a part of the edge detected by the edge detecting unit, the transparency setting unit setting a transparency degree to the edge region of the object image. The image data generating unit generates image data based on the print data and on the transparency degree for the edge region of the object image. The instruction unit issues a printing instruction instructing that a plurality of color component images are printed in a plurality of different colors one on another based on the image data.

According to another aspect, the invention provides an image processing method including: acquiring print data, the print data indicating an object image and a background image, a region of the object image being located at least partly inside a region of the background image; detecting at least a part of an edge of the object image; setting an edge region that is located inside the region of the object image and that extends along the at least a part of the detected edge, and setting a transparency degree to the edge region of the object image; generating image data based on the print data and on the transparency degree for the edge region of the object image; and issuing a printing instruction instructing that a plurality of color component images are printed in a plurality of different colors one on another based on the image data.

According to still another aspect, the invention provides a computer readable medium storing a set of program instructions, the instructions including: acquiring print data, the print data indicating an object image and a background image, a region of the object image being located at least partly inside a region of the background image; detecting at least a part of an edge of the object image; setting an edge region that is located inside the region of the object image and that extends along the at least a part of the detected edge, and setting a transparency degree to the edge region of the object image; generating image data based on the print data and on the transparency degree for the edge region of the object image; and issuing a printing instruction instructing that a plurality of color component images are printed in a plurality of different colors one on another based on the image data.

BRIEF DESCRIPTION OF THE DRAWINGS

The particular features and advantages of the invention as well as other objects will become apparent from the following description taken in connection with the accompanying drawings, in which:

FIG. 3 is a flowchart showing an object-trapping process performed in the printing process in FIG. 2;

FIGS. 4(a)-4(d) schematically illustrate how the object-trapping process is executed for one example of print data, wherein FIG. 4(a) is a diagram schematically illustrating an example of the print data acquired from the PC, FIG. 4(b) is a diagram schematically showing a virtual image that is defined based on the print data of FIG. 4(a), FIG. 4(c) is a diagram showing several regions that are set for the virtual image of FIG. 4(b) through the object-trapping process, and FIG. 4(d) shows a cyan plane (left side) and a black plane (right side) that are determined as a result of the object-trapping process;

FIG. 7 is a flowchart showing a printing process according to a second embodiment;

FIG. 8(a) is a flowchart explaining the object-trapping process according to a third embodiment;

FIG. 8(b) is a flowchart explaining the object-trapping process according to a fourth embodiment; and FIG. 8(c) is a flowchart explaining the object-trapping process according to a fifth embodiment.

DETAILED DESCRIPTION

Figure 1:
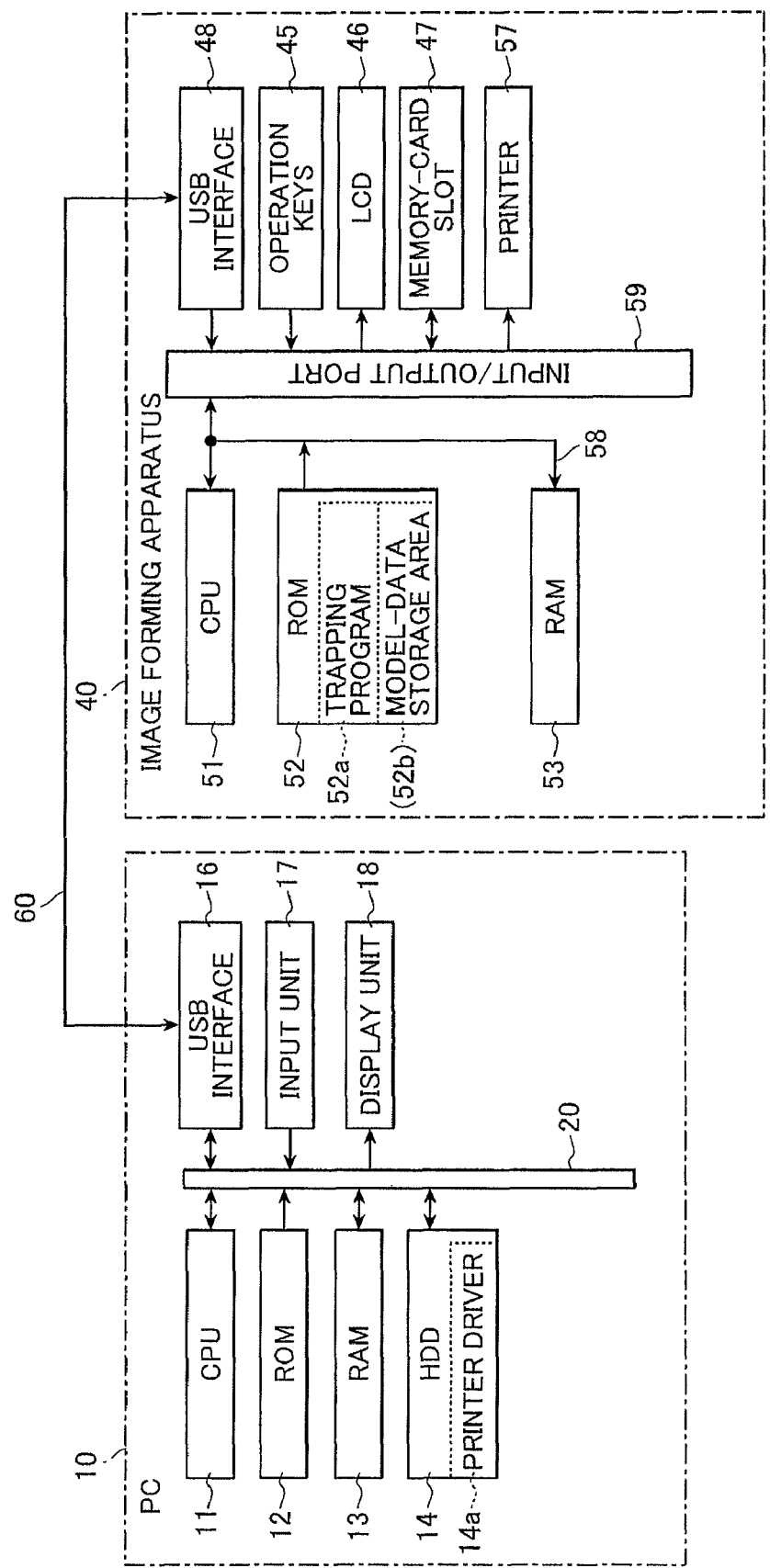
FIG. 1 is a block diagram showing an electric configuration of a personal computer and an image forming apparatus according to a first embodiment of the present invention.

An image processing apparatus according to embodiments of the invention will be described while referring to the accompanying drawings wherein like parts and components are designated by the same reference numerals to avoid duplicating description.

The embodiments of the present invention will be described with reference to the accompanying drawings.

FIG. 1 is a block diagram showing an electric configuration of a personal computer (hereinafter called "PC 10") and an image forming apparatus 40 according to a first embodiment of the present invention.

The PC 10 generates print data containing output color data, and outputs the print data to the image forming apparatus 40. The image forming apparatus 40 is a so-called tandem-type laser printer. The image forming apparatus 40 has a plurality of transfer drums. The image forming apparatus 40 uses the transfer drums to transfer images of a plurality of different print colors into a printing medium in accordance with the print data received from the PC 10, thereby generating a multi-color image.

The image forming apparatus 40 according to this embodiment sets a transparency degree to an edge region in an upper image, which appears as being located at least partly over a background image, thereby suppressing image-quality deterioration resulting from displacement in printing positions between images of the plurality of print colors.

As shown in FIG. 1, the PC 10 includes: a CPU 11, a ROM 12, a RAM 13, a hard disk drive 14 (hereinafter called "HDD 14"), a USB interface 16, an input unit 17, and a display unit 18. These components are connected to one another by a bus line 20.

The CPU 11 is a central processing unit that controls the components of the apparatus 40 in accordance with fixed values and programs stored in the ROM 12, RAM 13 and HDD 14. The ROM 12 stores programs for controlling the PC 10. The RAM 13 is a random-access memory for temporarily storing data that is required by the CPU 11 to execute processes. The HDD 14 is a hard disk drive in which a printer driver 14a is installed. The printer driver 14a can generate print data based on which the image forming apparatus 40 can print an image.

The input unit 17 is configured to input user's instructions. The input unit 17 is, for example, a keyboard and a mouse. The display unit 18 is, for example, a CRT display or a liquid crystal display and is configured to visually display various data items that are inputted to the PC 10 or that are obtained by the PC 10 executing processes.

The image forming apparatus 40 includes a CPU 51, a ROM 52, and a RAM 53. The CPU 51 is a central processing unit. The ROM 52 stores various control programs executed by the CPU 51 and various data items. The RAM 53 is for storing print data and control signals that are inputted from the PC 10, which is connected to the image forming apparatus 40.

The ROM 52 stores a trapping program 52a. The trapping program 52a will be described later with reference to flowcharts of FIGS. 2 and 3.

The CPU 51, ROM 52 and RAM 53 are connected to one another by a bus line 58. The bus line 58 is connected to an input/output port 59. The input/output port 59 is connected to: operation keys 45, an LCD 46, a memory-card slot 47, a USB interface 48, and a printer 57. With this configuration, the CPU 51 can control each component in the image forming apparatus 40.

The printer 57 includes: the plurality of transfer drums for a plurality of different print colors of cyan (C), magenta (M), yellow (Y), and black (K); and a motor for transporting a printing sheet (a recording medium) The printer 57 is a laser printer of a tandem type, and is configured to control the transfer drums to transfer images of the respective print colors onto a printing sheet, thereby forming a multi-color image on the printing sheet.

Next will be described with reference to FIGS. 2 to 6(b) how the CPU 51 of the image forming apparatus 40 controls the printer 57 to print a multi-color image by executing the trapping program 52a.

First will be described, with reference to FIG. 2, how the image forming apparatus 40 performs a printing process when receiving print data from the PC 10.

At the beginning of the printing process, in S1, the CPU 51 determines whether reception of print data transmitted from the PC 10 has been completed. The CPU 51 waits until reception of print data transmitted from the PC 10 is completed (No in S1). Upon completion of the reception of print data from the PC 10 (Yes in S1), the CPU 51 goes to S2.

Figure 4E:
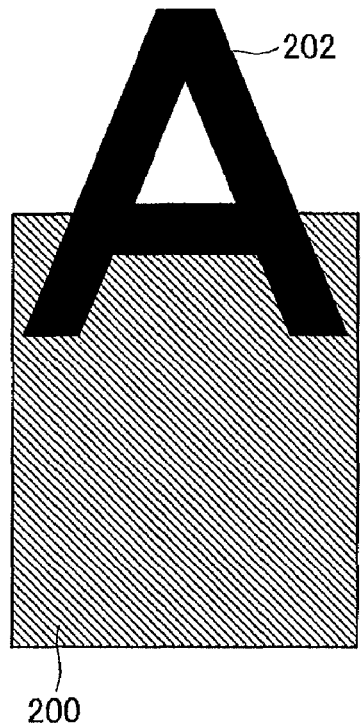
FIG. 4(e) is a diagram schematically showing another virtual image, in which an image is located partly over a background image, but partly protrudes outside the background image.

An example of the print data acquired from the PC 10 will be described with reference to FIG. 4(a). As shown in FIG. 4(a), the print data (Postscript) transmitted from the PC 10 contains commands 101 to 108.

Commands 101 and 102 cooperate to instruct that a rectangular region arranged at a specified position should be filled in by color of cyan. More specifically, command 101 describes "1 0 0 0 Setcmykcolor," instructing that an image should be formed by color data (C, M, Y, K)=(100%, 0%, 0%, 0%).

Command 102 describes "10 10 100 100 rectfill," instructing that a rectangle, whose one corner is located at a position defined by coordinates (10, 10, 100 and 100), should be filled in color indicated by command 101.

Commands 103 to 107 cooperate to instruct that a letter "A" of Time-Roman font should be printed in a specified size and at a specified position.

More specifically, command 103 describes "0 0 0 1 Setcmykcolor," instructing that an image should be formed in black, that is, by color data (C, M, Y, K)=(0%, 0%, 0%, 100%). Command 104 describes "Time-Roman Findfont," instructing that a font should be searched in a font directory of Time-Roman. Command 105 describes "10 Scalefont Setfont," designating the size of the image. Command 106 describes "10 10 move to," specifying the position where the image should be located. Command 107 describes "(A) show," indicating that a letter "A" should be formed.

Command 108 describes "showpage," instructing that printing should be executed in accordance with commands 101 to 107. In S1, the CPU 51 determines whether reception of print data for one page has been completed by confirming whether the command "showpage" has been received.

In addition to commands 101 to 108, the print data (Postscript) contains vector data and size data. The vector data represents position and orientation of images to print. The size data designates the size of the images. An image is formed based on the various data items contained in the print data.

Figure 4F:
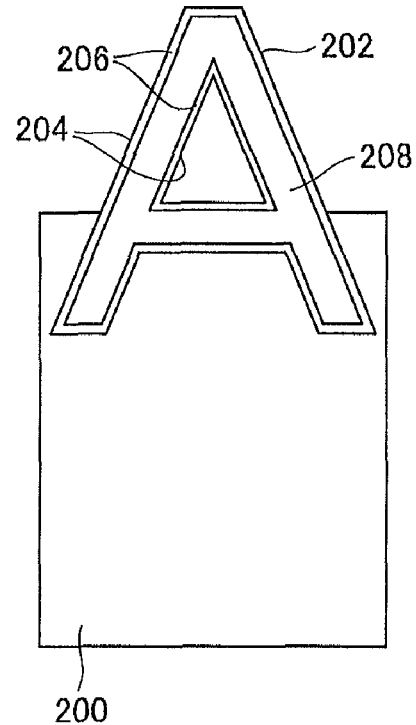
FIG. 4(f) is a diagram showing several regions that are set for the virtual image of FIG. 4(e) through the object-trapping process.
Figure 4G:
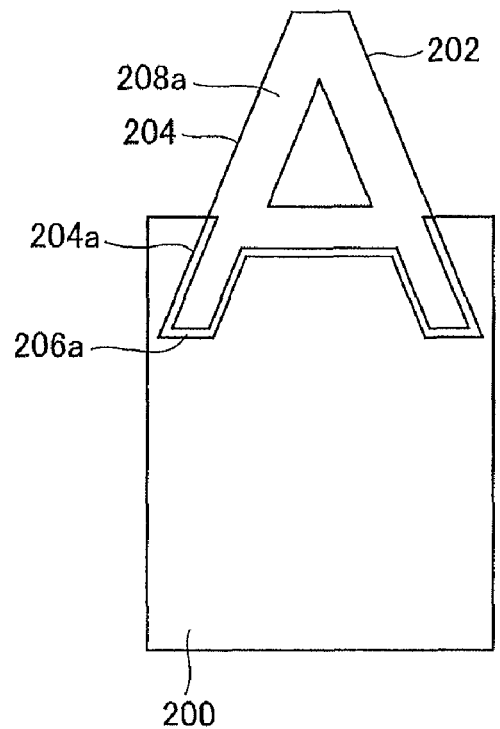
FIG. 4(g) is a diagram showing several regions that are set for the virtual image of FIG. 4(e) through the object-trapping process according to a third modification of the first embodiment.

FIG. 4(*b*) shows a virtual image that is defined based on the print data (commands 101 to 108). This image has: a background rectangular image 200 formed in cyan; and an upper image 202 of the letter "A" in the Time-Roman font that is formed in black and that is located within the region of the background rectangular image and appears as being placed over the background rectangular image 200. In the drawings, the cyan-painted background image 200 is indicated by diagonal lines that extend diagonally from top left to bottom right.

Figure 2:
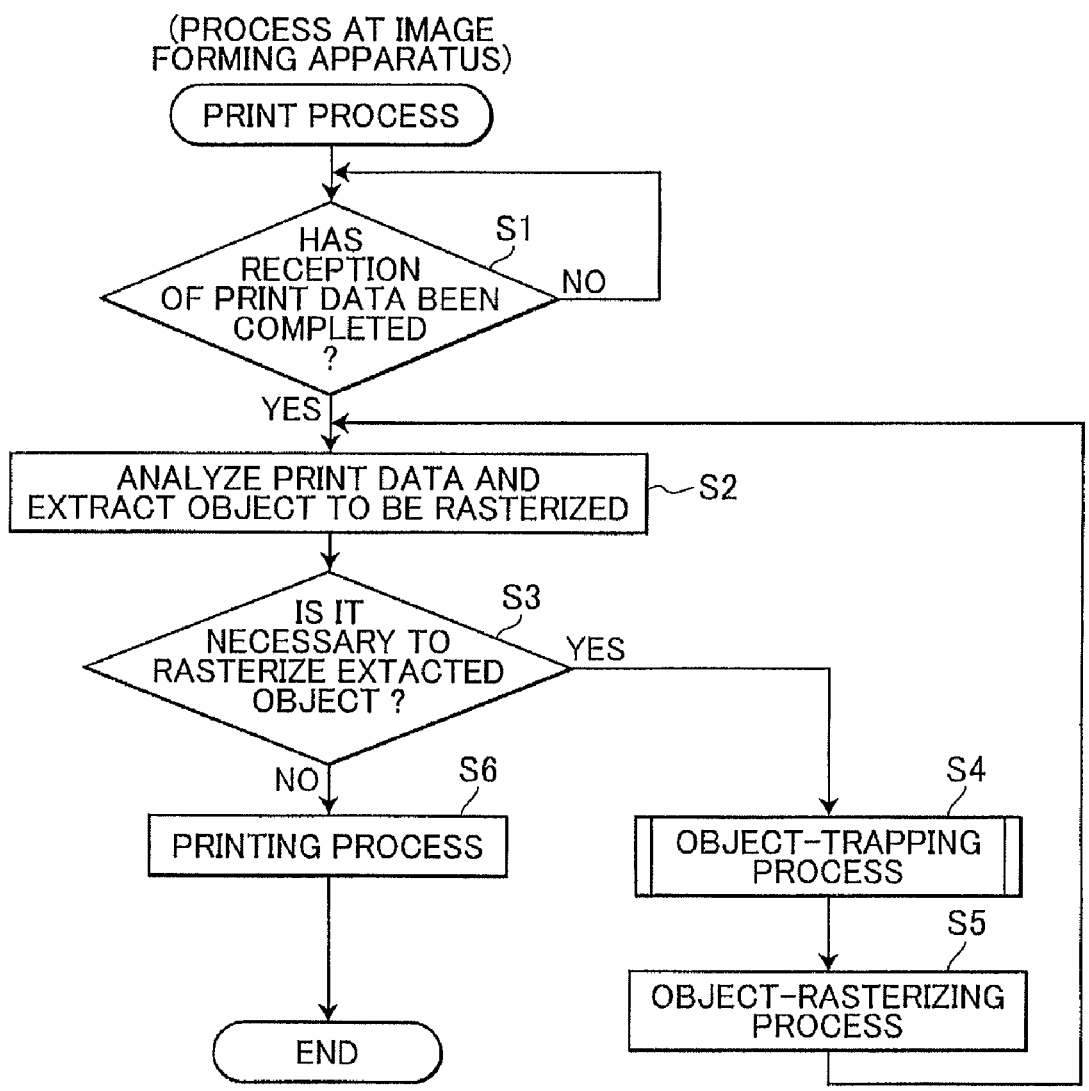
FIG. 2 is a flowchart showing a printing process performed by a CPU of the image forming apparatus in FIG. 1.

Referring back to the flowchart of FIG. 2, in S2, the CPU 51 analyzes the acquired print data and extracts an object to be rasterized. The "object to be rasterized" is a part that needs to be converted into an image through rasterization in order to be printed. In this example, when the process of S2 is executed first, the CPU 51 extracts the cyan rectangular image 200 as the object to be rasterized. When the process of S2 is executed for the second time, the CPU 51 extracts the black letter 202 as the object to be rasterized.

Next, in S3, the CPU 51 confirms whether the extracted object needs to be rasterized. More specifically, the CPU 51 confirms whether the object to be rasterized has been properly extracted in S2, and whether the properly-extracted object to be rasterized has not yet been rasterized and therefore has to be rasterized.

If the CPU 51 confirms in S3 that the object to be rasterized has been properly extracted in S2 and the properly-extracted object to be rasterized has to be rasterized (Yes in S3), the CPU 51 executes an object-trapping process in S4.

The object-trapping process of S4 will be described below with reference to FIG. 3.

In the object-trapping process, the CPU 51 sets, when appropriate, a transparency degree to an edge region of the object to be rasterized that has been extracted in S2. Hereinafter, the object to be rasterized will be simply referred to as "object."

At the beginning of the object-trapping process shown in FIG. 3, in S11, the CPU 51 first acquires data of color of the object from the print data shown in FIG. 4(*a*). The color of the object will be referred to as "object color" hereinafter.

Next, in S12, the CPU 51 acquires, from the print data of FIG. 4(*a*), data of color of a background image, on which the object is to be formed. The color of the background image will be referred to as "base color" hereinafter.

Then, in S13, the CPU 51 judges whether or not making transparent the edge region of the object will attain some advantageous effect.

In this example, the CPU 51 judges whether or not the base color is white. If the base color is not white, the CPU 51 determines that making transparent the edge region of the object will attain some advantageous effect. This is because if the base color is white, the base color is the same as the color of a recording medium (paper, for example), on which images will be formed, and therefore is the same as the color of a blank region which will be possibly formed if a displacement in positions occur between images of different colors. So, if the base color is white, the user can hardly recognize the displacement in positions between images of different colors.

When the CPU 51 determines that making transparent the edge region of the object will attain some advantageous effect (yes in S13), the CPU 51 detects in S14 an edge of the object, that is, a boundary line of the object.

Next, in S15, the CPU 51 performs an object edge region transparency degree setting process for setting an edge region within the object and for setting a transparency degree to the edge region. Details of the object transparency degree setting process will be described later.

On the other hand, when the CPU 51 does not determine that making transparent the object edge region will attain some advantageous effect (no in S13), the CPU 51 ends the object-trapping process of S4 without performing the process of S14 and S15.

Returning to FIG. 2, when the CPU 51 ends the object-trapping process of S4, the CPU 51 executes an object-rasterizing process in S5.

The object-rasterizing process of S5 is for generating bit-map data, for a region that is occupied by the object image extracted in S2, based on print data that has been acquired in S1 and using a transparency degree if the transparency degree has been determined in S4 for the edge region of the object image. The bit-map data indicates how the entire region occupied by the extracted object should be visualized.

Then, the process returns to S2, in which the CPU 51 tries again to extract another object to be rasterized.

On the other hand, when no objects to be rasterized are extracted in S2 but all objects to be rasterized have already been converted into bit-map data through the processes of S4 and S5 (No in S3), the CPU 51 knows that it is no more necessary to perform a rasterizing process. So, the CPU 51 executes a printing process in S6 in accordance with the bit-map data that is obtained through the rasterizing process of S5. That is, the CPU 51 issues a printing instruction to the printer 57 instructing that a plurality of color images should be printed in the plurality of print colors one on another on a recording medium based on the bit-map data, to thereby form a multi-color image. Then, the entire printing process is completed.

For example, when the print data shown in FIG. 4(*a*) is received in S1, the cyan rectangular image 200 is first extracted as an object in S2. The cyan rectangular image 200 is subjected to the object trapping process of S4 (yes in S3). In this case, the object color acquired in S11 is cyan. The base color acquired in S12 is white because the print data of FIG. 4(*a*) indicates that no image should be formed as a background image for the cyan rectangular image 200. Accordingly, the judgment in S13 is made negative (no in S13), and therefore the object edge detecting process of S14 or the object edge region transparency degree setting process of S15 is not executed for the cyan rectangular image 200. Then, the cyan rectangular image 200 is subjected to the rasterization process of S5. As a result, bit map data indicative of the cyan rectangular image 200 is generated.

Then, the program returns to S2, wherein the black letter image 202 is extracted as an object. The letter image 202 is then subjected to the object trapping process of S4 (yes in S3). In this case, the object color acquired in S11 is black. The base color acquired in S12 is cyan because the print data of FIG. 4(a) indicates that the cyan rectangular image 200 should be formed as a background image for the black letter image 202. Accordingly, the judgment in S13 is made positive (yes no in S13), and therefore the object edge detecting process of S14 and the object edge region transparency degree setting process of S15 are executed for the black letter image 202. Then, the black letter image 202 is subjected to the rasterization process of S5 based on the print data received in S1 and using the transparency degree set in S15. As a result, bit map data indicative of the black letter image 202 is generated for the region occupied by the black letter image 202. Out of the bit map data indicative of the cyan rectangular image 200, a part of the bit map data that is for the region of the black letter image 202 is overwritten with the bit map data for the black letter image 202. The resultant bit map data is indicative of the entire image where the black letter image 202 appears as being laid over the cyan rectangular image 200.

Next will be described, with reference to FIGS. 4(b)-4(d), details of the processes of S14, S15, and S5 for the case where the black letter image 202 is extracted as an object in S2.

In the following description, the object color acquired in S11 is represented by one set of object color data ($C_{object}$, $Y_{object}$, $M_{object}$, $K_{object}$), wherein $C_{object}$, $Y_{object}$, $M_{object}$, and $K_{object}$ are cyan, yellow, magenta, and black components of the object color, respectively. The values $C_{object}$, $Y_{object}$, $M_{object}$, and $K_{object}$ take values in the range of 0 to 100%. In this example, ($C_{object}$, $Y_{object}$, $M_{object}$, $K_{object}$)=(0%, 0%, 0%, 100%). The base color acquired in S12 is represented by one set of base color data ($C_{background}$, $Y_{background}$, $M_{background}$, $K_{background}$), wherein $C_{background}$, $Y_{background}$, $M_{background}$, and $K_{background}$ are cyan, yellow, magenta, and black components of the object color, respectively. The values $C_{background}$, $Y_{background}$, $M_{background}$ and $K_{background}$ take values in the range of 0 to 100%. In this example, ($C_{background}$, $Y_{background}$, $M_{background}$, $K_{background}$)=(100%, 0%, 0%, 0%).

In S14, the CPU 51 detects an edge 204 of the object 202 (letter "A") as shown in FIGS. 4(b) and 4(c). In this case, the edge 204 of the object image 202 is the same as a boundary line between the object image 202 and the background image 200 because the entire part of the object image 202 is inside the background image 200.

The CPU 51 detects the edge 204 of the object 202 (letter "A") based on the vector data contained in the print data transmitted from the PC 10. However, the CPU 51 may detect the edge 204 of the object 202 based only on the data instructing that the object 202 ("A") should be drawn. Alternatively, the CPU 51 may detect the edge 204 of the object 202 based both on the data instructing that the object 202 ("A") should be drawn and the data instructing that the background image 200 should be drawn. Otherwise, the CPU 51 may detect the edge 204 of the object 202 by using any other methods.

In S15, the CPU 51 sets an edge region 206 for the object 202 as shown in FIG. 4(c).

The edge region 206 is located inside the region of the object image 202 and extends along the edge 204 of the object image 202. It is noted that a remaining region that is inside the region of the object image 202 but that is other than the edge region 206 will be referred to as a "body region 208 of the object image 202" hereinafter. It is further noted that a remaining region that is inside the region of the background image 200 but that is outside the object image 202 will be referred to as a "body region 210 of the background image 200" hereinafter.

The CPU 51 sets the size and the shape of the edge region 206 based on the vector data, size data, and color data of the object image 202, which are contained in the print data and which represent the size, shape and brightness of the object image 202.

The CPU 51 may set the edge region 206 in the object image 202 in various ways considering various factors or conditions of the object image.

For example, the CPU 51 may set, as the edge region 206, an area that extends along the edge 204 and that has a width of a specific number of dots.

Alternatively, the CPU 51 may set, as the edge region 206, an area that extends along the edge line 204 and that is made up from dots whose number is equal to 5%, for example, of the total number of dots forming the object image 202.

The CPU 51 may vary the size and the shape of the edge region 206 depending on at least one of the size and the brightness of the object image 202.

Still alternatively, the CPU 51 may vary the size and the shape of the edge region 206 depending on the shape of the object image 202, that is, depending on whether the object image 202 is made up from one or more straight line or one or more curved line.

After setting the edge region 206 in the object image 202, the CPU 51 sets the transparency degree for the edge region 206.

The transparency degree is defined as a transmittance by which the base color is exhibited in the object color. The transparency degree is variable in a range of 0 to 100. When the transparency degree for the edge region 206 is set equal to 0, the edge region 206 will be formed with color the same as the object color. When the transparency degree for the edge region 206 is set equal to 100, the edge region 206 will be formed with color the same as the base color. When the transparency degree for the edge region 206 is set to X (0<x<100), the edge region 206 will be formed with a mixture of the (100−X) % of the object color and the X % of the base color.

The CPU 51 sets the transparency degree for the edge region 206 depending on the brightness of the object image 202.

More specifically, the CPU 51 sets the transparency degree of the edge region 206 so that the transparency degree decreases as the brightness of the object image 202 increases.

In this example, the CPU 51 sets the transparency degree X of the edge region 206 to 90 because the black component $K_{object}$ of the object image is equal to 100%, in other words, the object image 202 has the lowest brightness. The CPU 51 sets the transparency degree X to 80, for example, if the black component $K_{object}$ is equal to 50% and the object image 202 has a higher brightness.

In S5, the CPU 51 converts the entire region in the object into bit-map data by using the print data acquired in S1 and the transparency degree X that has been set for the edge region 206 of the object image 202 in S4.

More specifically, the CPU 51 first determines color of the edge region ($C_{edge}$, $M_{edge}$, $Y_{edge}$, $K_{edge}$) based on the object color ($C_{object}$, $M_{object}$, $Y_{object}$, $K_{object}$) and the base color ($C_{background}$, $M_{background}$, $Y_{background}$, $K_{background}$) by using the following formula and the transparency degree X set in S15.

$$(C_{edge}, M_{edge}, Y_{edge}, K_{edge}) = (C_{object}, M_{object}, Y_{object}, K_{object}) \times (100-X)/100 + (C_{background}, M_{background}, Y_{background}, K_{background}) \times X/100$$

For example, in this example, ($C_{object}$, $M_{object}$, $Y_{object}$, $K_{object}$)=(0%, 0%, 0%, 100%) and ($C_{background}$, $M_{background}$, $Y_{background}$, $K_{background}$)=(100%, 0%, 0%, 0%). Because X is set to 90, color of the edge region ($C_{edge}$, $M_{edge}$, $Y_{edge}$, $K_{edge}$) is calculated as being equal to (90%, 0%, 0%, 10%).

The CPU 51 then generates bit map data for the body region 208 of the object image 202 based on the color data (0%, 0%, 0%, 100%) for the black letter image 202, and generates bit map data for the edge region 206 of the object image 202 based on the color data (90%, 0%, 0%, 10%).

It is noted that bit map data has already been generated for the entire region of the cyan rectangular image 200 based on the color data (100%, 0%, 0%, 0%) during the object-rasterizing process of S5 for the cyan rectangular image 200. The entire region of the cyan rectangular image 200 contains both of the body region 208 and the edge region 206 of the black letter image 202. So, bit map data for the body region 208 of the black letter image 202 is overwritten with the bit map data newly generated for the same region based on the color data (0%, 0%, 0%, 100%). Similarly, bit map data for the edge region 206 of the black letter image 202 is overwritten with the bit map data newly generated for the same region based on the color data (90%, 0%, 0%, 10%).

Based on the thus generated bit map data for the entire image, four planes of the respective colors of cyan, magenta, yellow, and black are defined.

In this example, cyan and black planes are defined as shown in FIG. 4(*d*). The cyan plane is shown on the left side of FIG. 4(*d*), and the black plane is shown on the right side of FIG. 4(*d*).

On the black plane, the body region 208 of the black letter image 202 is defined by black component data of 100%, the edge region 206 of the black letter image 202 is defined by black component data of 10%, and the body region 210 of the cyan rectangular image 200 is defined by black component data of 0%. Accordingly, the body region 210 of the cyan rectangular image 200 is made blank. In the drawings, the region 208 that will be formed by black data of 100% is indicated by solid black, while the region 206 that will be formed by black data of lower than 100% is indicated by diagonal lines that extend from bottom left to top right.

On the cyan plane, the body region 210 of the cyan rectangular image 200 is defined by cyan component data of 100%, the edge region 206 of the black letter image 202 is defined by cyan component data of 90%, and the body region 208 of the black letter image 202 is defined by cyan component data of 0%. So, the body region 208 of the black letter image 202 is made blank. In the drawings, both of the region 210 that will be formed by cyan data of 100% and the region 206 that will be formed by cyan data of lower than 100% are indicated by diagonal lines that extend from top left to bottom right.

Figure 5A:
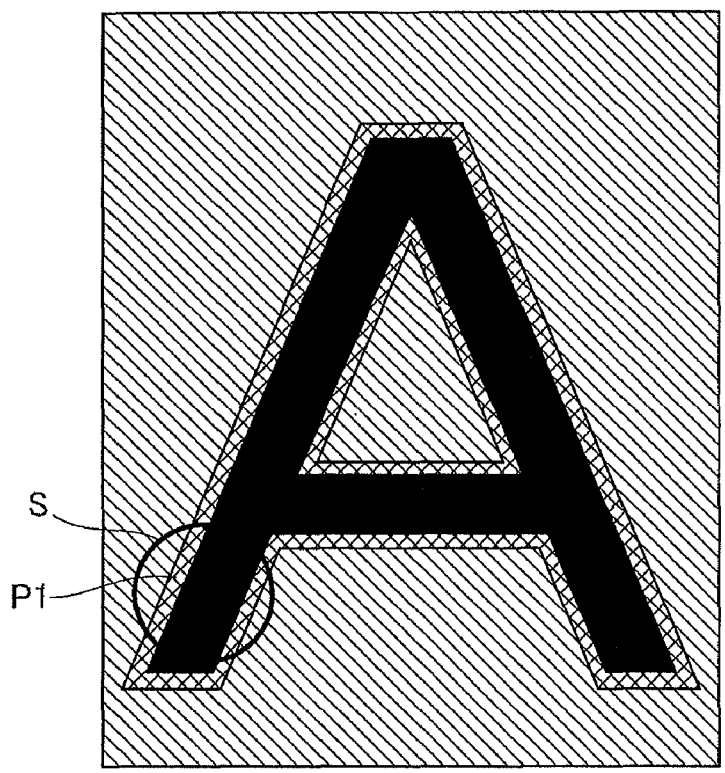
FIG. 5(a) is a diagram showing an example of an image obtained when the cyan plane and the black plane of FIG. 4(d) are printed one on another while being correctly positioned relative to each other.
Figure 5B:
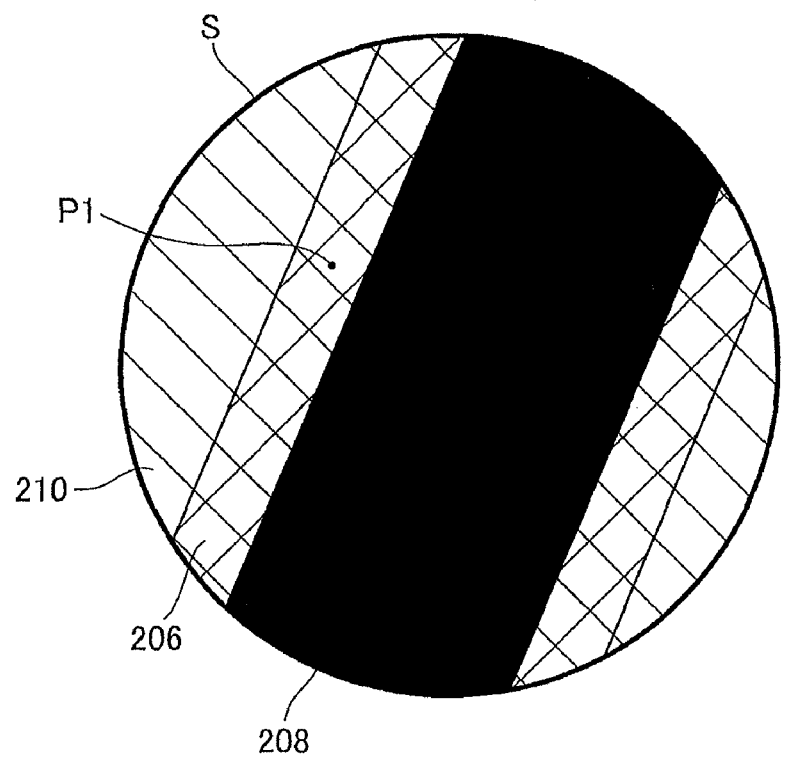
FIG. 5(b) is an enlarged view of a portion S in the image of FIG. 5(a)
Figure 6A:
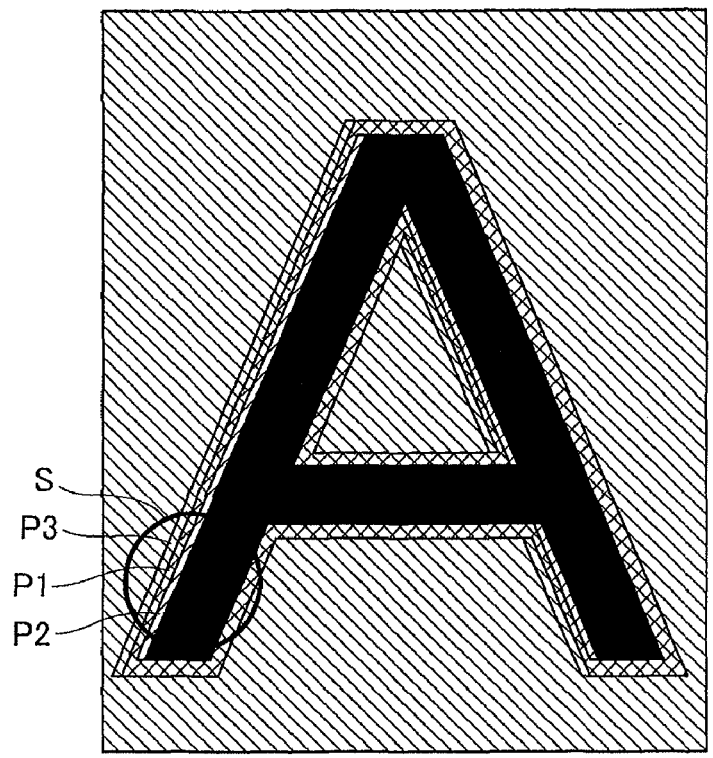
FIG. 6(a) is a diagram showing an example of an image obtained when the cyan plane and the black plane of FIG. 4(d) are printed one on another while being displaced in position from each other.
Figure 6B:
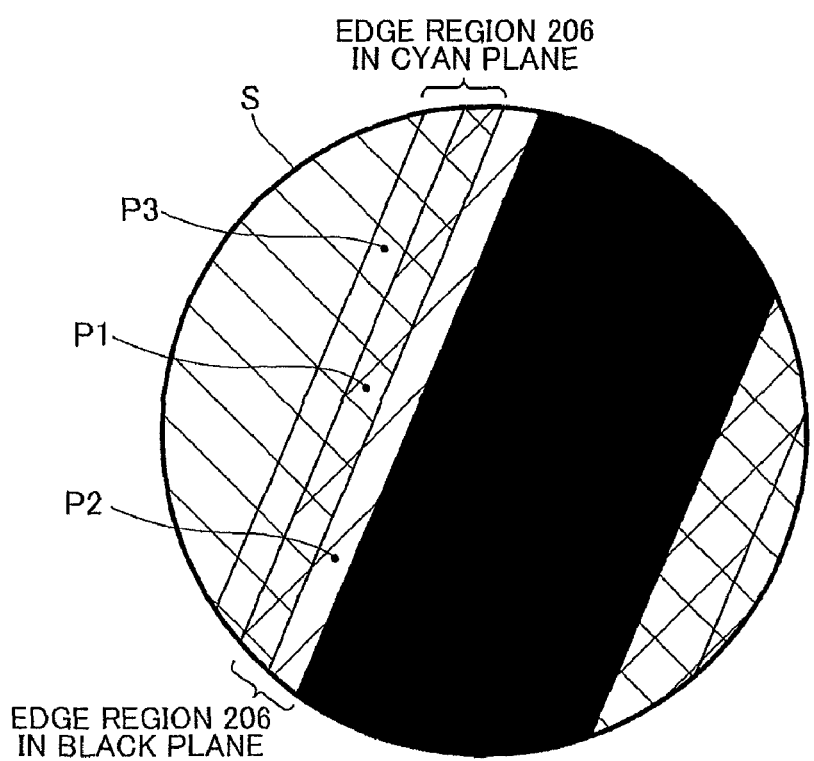
FIG. 6(b) is an enlarged view of a portion S in the image of FIG. 6(a)

FIG. 5(*a*) shows a resultant image printed based on the thus generated bit-map data in the case where the cyan image formed by a cyan transfer drum based on the cyan plane shown in the left part of FIG. 4(*d*) and the black image formed by a black transfer drum based on the black plane shown in the right part of FIG. 4(*d*) are not displaced in position from each other. FIG. 5(*b*) is an enlarged view of a portion S in the image of FIG. 5(*a*). FIG. 6(*a*) shows another resultant image printed based on the same bit-map data in the case where the black image formed by the black transfer drum is displaced in position to the right relative to the cyan image formed by the cyan transfer drum. FIG. 6(*b*) is an enlarged view of a portion S in the image of FIG. 6(*a*).

Because the black image is not displaced in position from the cyan image in FIGS. 5(*a*) and 5(*b*), the blank region (body region 208) on the cyan plane is completely overlapped by the solid black region (body region 208) on the black plane. So, no part of the blank region (body region 208) on the cyan plane is seen. Image quality is not deteriorated.

Additionally, at a region P1, the edge region 206 on the black plane is located completely over the edge region 206 on the cyan plane. So, both of cyan of 90% and black of 10% are printed in the region P1. Both of the diagonal lines extending from bottom left to top right (black) and the diagonal lines extending from top left to bottom right (cyan) are shown in the region P1.

So, color smoothly changes from the body region 210 of the cyan rectangular image 200 to the body region 208 of the black letter image 202 through the edge region 206 of the black letter image 202. This can maintain that the black letter image 202 looks clear, and can suppress deterioration of image quality.

Because the black image is displaced to the right from the cyan image in FIGS. 6(*a*) and 6(*b*), the edge region 206 on the black plane ranges over the regions P1 and P2, while the edge region 206 on the cyan plane ranges over the regions P1 and P3. That is, black of 10% and cyan of 90% are printed in the region P1. Both of the diagonal lines extending from bottom left to top right (black) and the diagonal lines extending from top left to bottom right (cyan) are shown in the region P1. In the region P3, cyan of 90% is printed, but black is not printed. Only the diagonal lines extending from top left to bottom right (cyan) are shown in the region P3. In the region P2, black of 10% is printed, but cyan is not printed. Only the diagonal lines extending from bottom left to top right (black) are therefore shown in the region P2. So, even though the blank region on the cyan plane (body region 208 of the black letter image 202 on the cyan plane) is shifted partly from the solid black region on the black plane (body region 208 of the black letter image 202 on the black plane) and is located partly on the region P2, the blank region on the cyan plane is still not observed because black of 10% is printed in the region P2.

In this way, even when different color planes formed by the transfer drums of the different colors are displaced from one another in position, the edge region 206 of the upper image 202 on one color plane will overlap with: the body region 210 of the background image 200 on another plane; the edge region 206 of the upper image 202 on the other plane; or the body region 208 of the upper image 202 (blank portion of the background image) on the other color plane. This can suppress the blank region of the background image on one color plane from being exposed as not being overlaid by another image on another color plane. Hence, the boundary between the upper image and the blank region of the background image is prevented from becoming conspicuous even if different color planes are displaced in position from one another. Deterioration of image quality, if any, can therefore be suppressed.

As described above, the edge of an object image to be rasterized is detected and the transparency degree is set to the edge region of the object image according to the first embodiment. Merely setting the transparency degree to the edge region of the object image to be rasterized can prevent border lines between the upper image and the blank region of the background image from becoming conspicuous even when different color planes are displaced from one another in position. The quality of the printed image can be prevented from deteriorating, while reducing the operating load of the image forming apparatus 40.

Because the upper image is not overprinted on the background image, consumption of toner used for printing can be prevented. The lifetime of the toner cartridge can be lengthened.

In the above-described example, the print data indicates that the entire region of the upper image 202 (black letter A) is located inside the region of the background image 200 (cyan rectangular image). However, the print data may indicate that the region of the upper image 202 be located partly inside the region of the background image 200, but partly outside the region of the background image 200 as shown in FIG. 4(*e*).

Still in this case, the color of the background image 200 is acquired as the base color in S12 similarly as described above for the case where the upper image 202 is entirely inside the background image 200. The entire edge 204 of the object image 204 is detected as the object edge in S14 as shown in FIG. 4(*f*). Accordingly, the edge region 206 is set for the entire edge 204 and the transparency degree is set for the entire edge region 206 in the same manner as described above for the case where the upper image 202 is entirely inside the background image 200.

Modifications of the above-described embodiment will be described below.

<First Modification>

In S13, the CPU 51 judges whether or not making transparent the object edge region will attain an advantageous effect by judging whether or not the base color is not white. However, the CPU 51 can perform the judgment of S13 in other methods.

Several examples of the other methods that the CPU 51 can employ in S13 will be described below.

<First Exemplary Method>

According to the first exemplary method, the CPU 51 judges whether or not the base color has a sufficiently high brightness. If the base color has a sufficiently high brightness, the CPU 51 determines that making transparent the object edge region will not attain an advantageous effect. This is because if the base color has a sufficiently high brightness, difference in brightness between the base color and white (color of a blank region) becomes sufficiently small and therefore the user can hardly recognize a displacement, if any, in positions between different colors.

More specifically, the CPU 51 calculates the maximum value among the cyan, magenta, yellow, and black components $C_{background}$, $M_{background}$, $Y_{background}$, $K_{background}$ of the base color, and judges whether or not the calculated maximum value is greater than or equal to a predetermined threshold (10%, for example). If the maximum value among the cyan, magenta, yellow, and black components of the base color is greater than or equal to the predetermined threshold, it is known that a difference in brightness between the base color and the white (blank region color) is not sufficiently small, and therefore the CPU 51 determines that making transparent the object edge region will attain an advantageous effect.

<Second Exemplary Method>

According to the second exemplary method, the CPU 51 judges whether or not the difference in brightness between the object color and the base color is greater than or equal to a predetermined threshold. If the difference in brightness between the object color and the base color is greater than or equal to the predetermined threshold, the CPU 51 determines that making transparent the object edge region will attain some advantageous effect. This is because if the difference in brightness between the object color and the base color is sufficiently small, the boundary between the object and the background will not appear conspicuous even if these images are displaced in position from each other.

More specifically, the CPU 51 judges whether or not the minimum value among: the difference between the cyan components of the object color and the base color; the difference between the magenta components of the object color and the base color; the difference between the yellow components of the object color and the base color; and the difference between the black components of the object color and the base color, is greater than or equal to a predetermined threshold (10%, for example.) In other words, the CPU 51 judges whether or not the difference in brightness between object color and base color defined by the following equation is greater than or equal to 10%:

$$\text{Difference in brightness between object color and base color} = \text{MIN}\{\text{absolute value of } (C_{object} - C_{background}), \text{absolute value of } (Y_{object} - Y_{background}), \text{absolute value of } (M_{object} - M_{background}), \text{absolute value of } (K_{object} - K_{background})\}$$

wherein MIN indicates an operator for selecting the minimum value among the values listed in the parenthesis { }.

If the difference in brightness between object color and base color is greater than or equal to 10%, the CPU 51 determines that making transparent the object edge region will attain some advantageous effect. This is because if the difference in brightness between the object color and the base color is greater than or equal to 10%, the user can recognize the difference.

<Third Exemplary Method>

According to the third exemplary method, the CPU 51 judges whether or not both of the object color and the base color has sufficiently high brightness. If both of the object color and the base color have sufficiently high brightness, the CPU 51 determines that making transparent the object edge region will attain no advantageous effect. This is because if the brightness of both of the object color and the base color is sufficiently high, the boundary between the object and the background does not appear conspicuous even if these images are displaced in position from each other.

Though several exemplary methods that the CPU 51 can employ in S13 have been described above, the CPU 51 can employ other various methods in S13 to judge whether or not making transparent the object edge region will attain some advantageous effect.

<Second Modification>

In S15, the CPU 51 sets the transparency degree for the edge region 206 dependently on the brightness of the object color. However, the CPU 51 can set the transparency degree for the edge region 206 in other various methods.

Next will be described other exemplary methods that the CPU 51 can employ to set the transparency degree for the edge region 206 in S15.

<First Exemplary Method>

According to the first exemplary method, the CPU 51 sets the transparency degree for the edge region 206 dependently on the difference in brightness between the object color and the base color.

For example, the CPU 51 sets the transparency degree for the edge region 206 so that the transparency degree will increase as the difference in brightness between the object color and the base color increases and so that the transparency degree will decrease as the difference in brightness between the object color and the base color decreases.

More specifically, the CPU 51 determines the minimum value among: the difference in brightness between the cyan components of the object color and the base color; the difference in brightness between the magenta components of the object color and the base color; the difference in brightness between the yellow components of the object color and the base color; and the difference in brightness between the black components of the object color and the base color. The CPU 51 then multiplies the determined minimum value by 0.5, and sets a resultant value as the transparency degree of the edge region 206 of the object image. In this case, the transparency degree X can be expressed by the following formula:

$$X=0.5*\text{MIN}\{\text{absolute value of }(C_{object}-C_{background}),\\ \text{absolute value of }(Y_{object}-Y_{background}), \text{absolute}\\ \text{value of }(M_{object}-M_{background}), \text{absolute value of}\\ (K_{object}-K_{background})\}$$

In this case, the transparency degree X takes a value in a range of 0 to 50.

<Second Exemplary Method>

According to the second exemplary method, the CPU 51 sets the transparency degree for the edge region 206 dependently on whether the object color and the base color have more than zero (0) % for at least one common color component. The CPU 51 sets the transparency degree to a relatively low value when the object color and the base color have more than zero (0) % for at least one common color component.

More specifically, the CPU 51 determines whether or not at least one of cyan, magenta, yellow, and black components has more than zero (0) % in both of the object color and the base color. The CPU 51 sets the transparency degree to a relatively low value when at least one of cyan, magenta, yellow, and black has more than zero (0) % in both of the object color and the base color. This is because even when the positional displacement occurs between colors, no blank region of white will be formed if the object color and the base color have more than zero (0) % for at least one common color component.

For example, the CPU 51 sets the transparency degree to a relatively low value when the object color is indicated by $(C_{object}, M_{object}, Y_{object}, K_{object})=(90\%, 0\%, 90\%, 0\%)$, and the base color is indicated by $(C_{background}, M_{background}, Y_{background}, K_{background})=(100\%, 0\%, 0\%, 0\%)$. This is because in this example, the object color and the base color have more than 0% for at least cyan, which serves as the common color component in this example.

Though several exemplary methods that the CPU 51 can employ in S15 to set the transparency degree for the edge region 206 has been described above, the CPU 51 can employ in S15 other various methods to set the transparency degree for the edge region 206.

<Third Modification>

In the above description, the entire edge 204 of the object image 202 is detected as the object edge in S14. However, only a boundary 204*a* between the object image 202 and the background image 200 may be detected as the object edge for the object 202 as shown in FIG. 4(*g*). The boundary 204*a* is a part of the edge 204 of the object image 204 that is located inside the background image 200. In this case, in S15, a boundary region 206*a* is set as an edge region for the object image 204*a*. The boundary region 206*a* is inside the object image 202 and extends along the boundary 204*a* as shown in FIG. 4(*g*). A transparency degree is set for the boundary region 206*a* in the same manner as described above for the edge region 206. Accordingly, in S5, bitmap data for the boundary region 206*a* is generated in the same manner as described above for the edge region 206. Bitmap data for a remaining region of the object image 202 other than the boundary region 206*a* (body region 208*a* of the object image 202) is generated in the same manner as described above for the body region 208 of the object image 202.

Second Embodiment

A second embodiment of the invention will be described with reference to FIG. 7.

According to the second embodiment, the printing process shown in FIG. 2 of the first embodiment is modified as shown in FIG. 7.

In the first embodiment, the object-trapping process is performed irrespective of the shape of the object that should be rasterized. In the second embodiment, the CPU 51 judges whether or not to perform the object-trapping process dependently on the shape of the object to be rasterized. Note that steps identical to those performed in the first embodiment are designated by the same reference symbols and will not be described in detail.

In the printing process of the second embodiment, similarly to the first embodiment, the CPU 51 judges in S1 whether or not reception of print data has been completed. If print data has been completely acquired (Yes in S1), the CPU 51 analyzes the print data and extracts an object to be rasterized in S2. Then, the CPU 51 judges whether or not the extracted object needs to be rasterized in S3. If the object needs to be rasterized (Yes in S3), the process goes to S21.

In S21, the CPU 51 judges the shape of the object to be rasterized. More precisely, the CPU 51 judges whether the shape of the object is a font (character or letter), a line, or an image graphic (such as a photograph or a picture, for example).

If the object to be rasterized is a font ("font" in S21), the CPU 51 performs an object-trapping process for the font in S22. If the object is a line ("line" in S21), the CPU 51 performs an object-trapping process for the line in S23. If the object is an image graphic ("image graphic" in S21), the process goes directly to S5, skipping the object-trapping process.

The processes performed in S22 and S23 are similar to the object-trapping process performed in S4 described above in the first embodiment. That is, the CPU 51 sets an edge region to the character or letter and sets a specific transparency degree for the edge region in S22. The CPU 51 sets an edge region to the line and sets a specific transparency degree for the edge region in S23.

In S5, the CPU 51 executes the object-rasterizing process.

Thereafter, if there are no other objects to be rasterized (No in S3), the CPU 51 executes the printing process in S6, and ends this printing process.

As described above, according to the present embodiment, to execute the object-trapping process is determined dependently on whether the object to be rasterized is a font, a line, or an image graphic. Graphic images have subtle color and a complex shape. So, a complicated process has to be performed to detect an edge of the object, to set an edge region in the object, and to set a transparency degree to the edge region of the graphic image. Additionally, the blank region of the background image can hardly be conspicuous even if different color planes are displaced in position from one another.

According to the second embodiment, the object-trapping process is performed if the upper image is a font or a line, and is not performed if the upper image is a graphic image. Therefore, setting of the transparency degree is executed only if setting the transparency adds an advantageous effect to the image. This helps to prevent the image quality from deteriorating, while reducing the operating load of the image forming apparatus 40.

Third to Fifth Embodiments

Third to fifth embodiments of the present invention will be described with reference to FIGS. 8(*a*) to 8(*c*).

In the first embodiment, the object-trapping process of S4 is executed as shown in FIG. 3. In the second embodiment, each of the object-trapping processes of S22 and S23 is executed as shown in FIG. 3. According to the third to fifth embodiments, each of the object-trapping processes of S4 (first embodiment) and S22 and S23 (second embodiment) is executed as shown in FIGS. 8(*a*) to 8(*c*), respectively. Steps that are identical to those performed in the first and second embodiments are designated by the same reference symbols and will not be described in detail.

According to the third embodiment, as shown in FIG. 8(*a*), S11-S13 are not executed contrarily to the first embodiment. So, according to the present embodiment, if one object is extracted in S2 and it is confirmed in S3 that the object has to be rasterized, an edge of the object is always detected in S14 and a transparency degree is always set to an edge region of the object in S15. Thus, in the third embodiment, the object edge region is always made transparent, regardless of the base color and the object color. This can reliably suppress deterioration of image quality resulting from the positional displacement of different color planes.

According to the fourth embodiment, as shown in FIG. 8(*b*), when the object-trapping process is started, the CPU 51 detects a first edge of the object image in S31. The first edge of the object is identical to the object edge 204 detected in the first embodiment (see FIG. 4(*c*)), and serves as a boundary between the object image and the background image, in this example.

Next, the CPU 51 sets a first edge region in the object image, and sets a transparency degree to a first edge region in S32. The first edge region is identical to the edge region 206 set in the first embodiment (see FIG. 4(*c*)).

Next, in S33, the CPU 51 sets a second edge of the object. The second edge is located within the object image on an inner side relative to the first edge, and is a boundary between the body region of the object image and the first edge region of the object image. In the case of FIG. 4(*c*), the second edge of the object 202 is the boundary between the body region 208 of the object image 202 and the edge region 206 (first edge region).

Next, in S34, the CPU 51 sets a second edge region that is located inside the body region of the object image and that extends along the second edge, and sets a transparency degree to the second edge region. Hence, in the example of FIG. 4(*c*), the second edge region is set to a region that is located inside the body region 208 of the object image 202 and that extends along the boundary between the edge region 206 and the body region 208 of the object image 202.

The transparency degree set for the second edge region in S34 is lower than the transparency degree set for the first edge region in S32. This ensures that the transparency decreases in steps from the outermost part to the inner side of the object image. The boundary between the background and the object image becomes less conspicuous if different color planes are displaced in position from one another.

It is noted that in the object-trapping process of the present embodiment (FIG. 8(*b*)), the processes of S11-S13 in the first embodiment may be executed before the process of S31 is executed. In S11, the object color is acquired. In S12, the base color is acquired. In S13, it is confirmed whether or not making transparent the object edge region will attain some advantageous effect. In this case, the processes of S31-S34 are executed only when it is confirmed that making transparent the object edge region will attain some advantageous effect.

In the above description, the first and second edges are set for the object image, and first and second levels of transparency are set to the first and second edge regions, respectively. However, one or more additional edges may be set in the object image on the inner side of the second edge region, and one or more additional levels of transparency may be set to the one or more additional edge regions. For example, a third edge is set in the object image as an inner edge of the second edge region, a third edge region is set on the inner side of the third edge, and a third level of transparency is set to the third edge region. The third level of transparency is set as being lower than the second level of transparency. Further, a fourth edge is set in the object image as an inner edge of the third edge region, a fourth edge region is set on the inner side of the fourth edge, and a fourth level of transparency is set to the fourth edge region. The fourth level of transparency is set as being lower than the third level of transparency.

An arbitrary number of edge regions may be set in steps in the object image from the outermost side toward the innermost side, and transparency degrees may be set to decrease in steps from the outermost edge region toward the innermost edge region. Assuming that n is an arbitrary integer greater than two, an n-th edge may be set in the object image as an inner edge of the (n−1)-th edge region, an n-th edge region is set on the inner side of the n-th edge, and an n-th level of transparency is set to the n-th edge region. The n-th level of transparency is set as being lower than the (n−1)-th level of transparency. Still further, the size of the edge region may decrease or increase in steps from the outermost edge region toward the innermost edge region.

According to the fifth embodiment, the ROM 52 further has a model-data storage area 52*b* as shown in FIG. 1. The model-data storage area 52*b* holds model data that represents the functions, the specifications, and the version information of the image forming apparatus 40.

As shown in FIG. 8(*c*), when the object-trapping process of the fifth embodiment is started, the CPU 51 acquires the model data from the model-data storage area 52*b* provided in the ROM 52 in S41.

Next, in S42, the CPU 51 determines, based on the acquired model data, whether the image forming apparatus 40 is of such a model that is likely to cause a vertical displacement in different color planes.

Whether the image forming apparatus 40 is likely to make a vertical or horizontal displacement with respect to the sheet-transporting direction can be inferred from the mechanism for transporting recording sheets and from the method used in the apparatus 40 to print images. So, in S42, the CPU 51 confirms, based on the model data of the image forming apparatus 40, whether the present image forming apparatus 40 is likely to make a vertical displacement. The vertical displacement with respect to the sheet-transporting direction is defined as a displacement in which different color planes are displaced in a direction parallel to the sheet transporting direction. The horizontal displacement with respect to the sheet-transporting direction is defined as a displacement in which different color planes are displaced in a direction intersecting with the sheet transporting direction.

If the image forming apparatus 40 is found to be a model that is likely to make a vertical displacement (Yes in S42), the CPU 51 detects in S43 a vertical edge of the object that extends in a direction intersecting with the sheet transporting direction. Then, in S44, the CPU 51 sets a transparency degree to a vertical edge region in the object image. The vertical edge region is located inside the object image and extends along the vertical edge.

If the image forming apparatus 40 is found to be a model that is likely to make a horizontal displacement (No in S42), the CPU 51 detects in S45 a horizontal edge of the object that extends in a direction parallel with the sheet transporting direction. Then, in S46, the CPU 51 sets a transparency degree to a horizontal edge region in the object image. The horizontal edge region is located inside the object image and extends along the horizontal edge.

In this way, if the apparatus 40 is likely to make a positional displacement in the printing direction for sequentially transporting a printing sheet (yes in S42), transparency is set for the upper and lower side edges of the object image relative to the background image with respect to the sheet transporting direction in S43 and S44. If the apparatus 40 is likely to make a positional displacement in the direction intersecting with the printing direction (no in S42), transparency is set for the right and left side edges of the object image relative to the background image with respect to the sheet transporting direction in S45 and S46.

So, in the fifth embodiment, the object-trapping process can be performed only on such an edge of the object that should be subjected to the object-trapping process.

While the invention has been described in detail with reference to the embodiments thereof, it would be apparent to those skilled in the art that various changes and modifications may be made therein without departing from the spirit of the invention.

For example, in the above description, the image forming apparatus 40 executes the object-trapping process. However, the PC 10 may perform the object-trapping process. In this case, the programs shown in FIGS. 2, 3, 7 and 8(a) to 8(c) are incorporated in the printer driver 14a.

The ROM 52 may store an average amount of displacements, by which different color planes are displaced in position from one another according to the image forming apparatuses 40 of the same model. In S15, the CPU 51 determines the width of the edge region 206 dependently on the average amount of displacements.

Though several examples of the method that the CPU 51 can employ in S13 to judge whether or not making transparent an object edge region will attain an advantageous effect have been described, the present invention should not be limited to the examples. The present invention can employ other various methods to judge whether or not making transparent the object edge region will attain an advantageous effect.

Similarly, though several examples of the method that the CPU 51 can employ in S15 to set the transparency degree for the edge region 206 have been described, the present invention should not be limited to the examples. The present invention can employ other various methods to set the transparency degree for the edge region.

In the above description, the trapping program 52a is stored in the ROM 52. However, the trapping program 52a may be stored in other various types of computer readable media, such as CD-ROM.

What is claimed is:

1. An image processing apparatus comprising:
an acquisition unit that acquires print data, the print data indicating an object image and a background image, a region of the object image being located at least partly inside a region of the background image;
an edge detecting unit that detects at least a part of an edge of the object image;
a transparency setting unit that sets an edge region that is located inside the region of the object image and that extends along the at least a part of the edge detected by the edge detecting unit, the transparency setting unit setting a transparency degree to the edge region of the object image;
an image data generating unit that generates image data based on the print data and on the transparency degree for the edge region of the object image; and
an instruction unit that issues a printing instruction instructing that a plurality of color component images are printed in a plurality of different colors one on another based on the image data.

2. The image processing apparatus according to claim 1, wherein the edge detecting unit detects an entire part of the edge of the object image, the transparency setting unit setting the edge region that is located inside the region of the object image and that extends along the entire part of the edge of the object image.

3. The image processing apparatus according to claim 1, wherein the edge detecting unit detects a boundary between the object image and the background image as the at least a part of the edge of the object image, the transparency setting unit setting the edge region that is located inside the region of the object image and that extends along the boundary between the object image and the background image.

4. The image processing apparatus according to claim 1, wherein the transparency setting unit sets, to the edge region of the object image, the transparency degree that decreases in one or more steps away from the at least a part of the edge.

5. The image processing apparatus according to claim 1, wherein the transparency setting unit includes:
a brightness acquisition unit that acquires data representing brightness of the object image and the background image contained in the print data; and
a transparency degree determining unit that determines the transparency degree for the edge region of the object image dependently on a difference in brightness between the object image and the background image.

6. The image processing apparatus according to claim 1, further comprising:
a transparency-setting judging unit that judges whether or not to set the transparency degree to the edge region of the object image;
wherein the transparency setting unit sets the transparency degree to the edge region of the object image when the transparency-setting judging unit determines to set the transparency degree to the edge region of the object image.

7. The image processing apparatus according to claim 6, wherein the transparency-setting judging unit includes:
a brightness acquisition unit that acquires data representing brightness of the object image and the background image contained in the print data; and
a judging unit that judges whether or not to set a transparency degree to the edge region of the object image dependently on a difference in brightness between the object image and the background image.

8. The image processing apparatus according to claim 6, wherein the transparency-setting judging unit includes:
a shape acquisition unit that acquires data contained in the print data and representing shape of the object image,
a judging unit that determines to set the transparency degree to the edge region of the object image when the shape of the object image is a character or a line, and not to set the transparency degree to the edge region of the object image when the shape of the object image is not a character or a line.

9. The image processing apparatus according to claim 6, wherein the transparency-setting judging unit determines to set the transparency degree to the edge region of the object image when the object image is not a graphic image, and not to set the transparency degree to the edge region of the object image when the object image is a graphic image.

10. The image processing apparatus according to claim 1, further comprising:
   a model acquisition unit that acquires model data on a printing unit, to which the instruction unit issues the printing instruction, the printing unit being configured to print constituent parts in each color component image in succession in a predetermined printing direction, the object image having a first edge that extends along the printing direction and a second edge that extends in a direction intersecting with the printing direction,
   wherein the edge detecting unit detects one of at least a part of the first edge and at least a part of the second edge of the object image dependently on the model data acquired by the model acquisition unit.

11. The image processing apparatus according to claim 1, wherein the object image has a body region that is other than the edge region and the background image has a body region that is other than the object image,
   wherein the image data generating unit generates the image data for the edge region of the object image based on the print data for the background image, on the print data for the object image, and on the transparency degree,
   wherein the image data generating unit generates the image data for the body region of the object image based on the print data for the object image, and
   wherein the image data generating unit generates the image data for the body region of the background image based on the print data for the background image.

12. The image processing apparatus according to claim 1, wherein the transparency setting unit includes:
   a brightness acquisition unit that acquires data representing brightness of at least one of the object image and the background image contained in the print data; and
   a transparency degree determining unit that determines the transparency degree for the edge region of the object image dependently on the brightness of the at least one of the object image and the background image.

13. The image processing apparatus according to claim 6, wherein the transparency-setting judging unit includes:
   a brightness acquisition unit that acquires data representing brightness of at least one of the object image and the background image contained in the print data; and
   a judging unit that judges whether or not to set a transparency degree to the edge region of the object image dependently on brightness of the at least one of the object image and the background image.

14. An image processing method comprising:
   acquiring print data, the print data indicating an object image and a background image, a region of the object image being located at least partly inside a region of the background image;
   detecting at least a part of an edge of the object image;
   setting an edge region that is located inside the region of the object image and that extends along the at least a part of the detected edge, and setting a transparency degree to the edge region of the object image;
   generating image data based on the print data and on the transparency degree for the edge region of the object image; and
   issuing a printing instruction instructing that a plurality of color component images are printed in a plurality of different colors one on another based on the image data.

15. A non-transitory computer readable medium storing a set of program instructions, the instructions comprising:
   acquiring print data, the print data indicating an object image and a background image, a region of the object image being located at least partly inside a region of the background image;
   detecting at least a part of an edge of the object image;
   setting an edge region that is located inside the region of the object image and that extends along the at least a part of the detected edge, and setting a transparency degree to the edge region of the object image;
   generating image data based on the print data and on the transparency degree for the edge region of the object image; and
   issuing a printing instruction instructing that a plurality of color component images are printed in a plurality of different colors one on another based on the image data.

* * * * *